United States Patent Office 2,992,674
Patented July 18, 1961

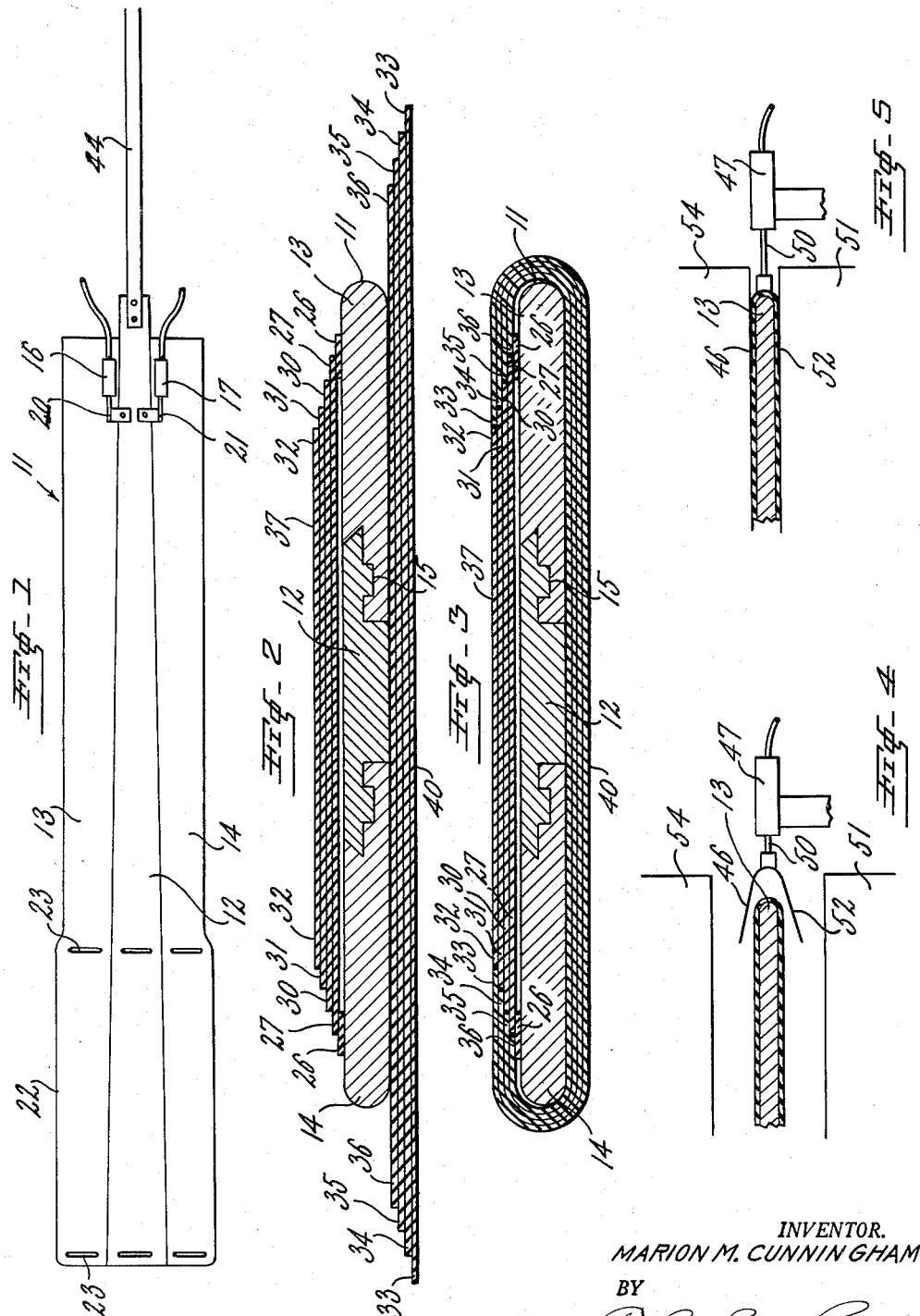

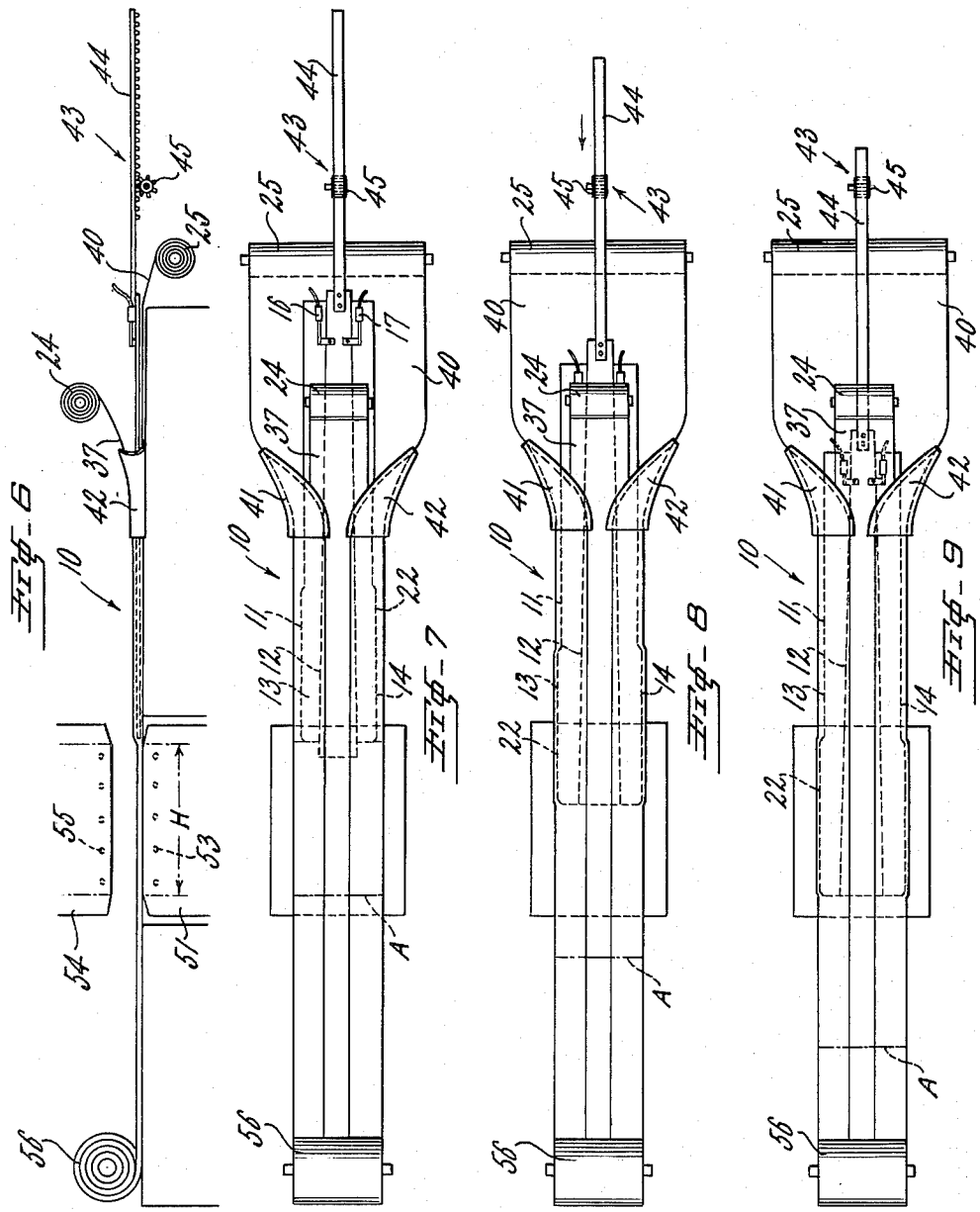

2,992,674
APPARATUS FOR CONTINUOUSLY FORMING
TUBULAR CONTAINERS
Marion M. Cunningham, Providence, R.I., assignor to
United States Rubber Company, New York, N.Y., a
corporation of New Jersey
Filed Mar. 23, 1960, Ser. No. 17,170
6 Claims. (Cl. 154—1.8)

This invention relates to an apparatus for continuously forming tubular containers and, more specifically, to such an apparatus especially adapted to form the body portions of containers of the type described in U.S. Patent No. 2,865,419 and in U.S. patent application Serial No. 695,961, filed November 12, 1957 now Patent No. 2,930,423.

The above-mentioned patent and patent application disclose a very simple but useful type of collapsible container, which consists of a tube formed of flexible material and closed off at each end by clamps. Such containers, formed of rubberized cord fabric, have created considerable interest in the transportation field. They are used to ship and store a variety of products; when empty, they are easily rolled up and occupy a minimum amount of space.

It has been the practice to fabricate a container of this type without special forms by laminating bias-cut plies of cord fabric to form a generally rectangular sheet, folding the sheet over on itself and then securing the marginal edges together to form a tube. The tube so fabricated may then be cured or vulcanized while in a flattened condition in a relatively inexpensive flat press. An adhesion-preventing substance, for instance powdered soap stone, is introduced into the tube before the curing operation to make this possible. This method of manufacture was disclosed in U.S. Patent No. 2,381,074.

In the manufacture of very large containers of this type, however, a very great amount of factory floor space has been required to accommodate the full width of the unfolded material. Thus, a space equal to twice the width of the finally-constructed container must be available. This waste of floor area of necessity adds to the final cost of the product.

It has been learned that these tubular containers may be made having more than one longitudinal seam. In this maner it is possible to decrease the amount of factory floor space required, inasmuch as the widest piece of material will be less wide than the double width of the ultimate container.

Furthermore, it would be desirable to reduce manufacturing costs by forming the tubular portion of these containers continuously. In this way, lengths of the tube could be cut off as desired to form containers of various sizes.

It is, thus, an object of the present invention to produce tubular containers of the type described in a continuous manner.

It is a further object of the present invention to produce these containers using a minimum amount of factory floor space.

It is a further object of the present invention to produce these containers with more than one longitudinal seam in the tubular body portion thereof if the tube is large.

It is a further object of the present invention to press and mold these containers both on the inside and on the outside, thereby to achieve a smooth inside surface. This not only will facilitate cleaning the ultimate containers, but it will also make the seams flow on the inside so no interior taping will be necessary.

It is a still further object of this invention to device apparatus which will taken rolls of pre-laminated rubber coated cord fabric plies, form them into the required tubular shape, seam them while curing the thus formed tube, and roll up the cured flattened fabricated tube, all in a continuous manner, thus to permit lengths of the tube to be cut off as desired to form the subject containers.

In accordance with the foregoing objects, I have invented an apparatus for forming such a continuous collapsible tube from flexible vulcanizable material. My apparatus comprises an expandable core plate around which the tube may be formed, means to guide the flexible vulcanizable material in folded overlapping relationship around the core plate, means to expand the core plate laterally to grip a length of the flexible material folded around the core plate, and means to advance the thus expanded core plate and the thus gripped length of flexible material longitudinally forward. A heated lower platen is disposed beneath the forward portion of the expandable core plate, the platen being adapted to withstand the application of pressure. Finally, a reciprocable pressing platen is mounted directly above the lower platen and is adapted to exert pressure on the length of flexible material folded around the core plate and disposed over the lower platen. The apparatus is thus equipped to form the tubular body portions of these containers in a continuous manner by curing one length of material at a time.

The invention having been broadly described, a more detailed description of one embodiment is given hereafter by reference to the accompanying drawings wherein:

FIG. 1 is a plan view of the expandable core plate which is a feature of the instant invention;

FIG. 2 is an end view of the core plate of FIG. 1, showing in schematic fashion the various plies of flexible vulcanizable material before such plies are folded around the core plate;

FIG. 3 is an end view of the core plate of FIG. 1, showing in schematic fashion the positioning of the various plies of flexible vulcanizable material after they have been folded around the core plate;

FIG. 4 is a cross-sectional view through the forward portion of the expandable core plate, showing the curved edge mold plates in position prior to the actual curing operation;

FIG. 5 is a cross-sectional view also through the forward portion of the expandable core plate, showing the curved edge mold plates in the position they take during the actual curing operation;

FIG. 6 is a side view of my entire apparatus at the start of a cycle;

FIG. 7 is a plan view of my entire apparatus at the start of a cycle;

FIG. 8 is a plan view of my entire apparatus as it is advancing a length of flexible material longitudinally forward; and FIG. 9 is a plan view of my entire apparatus during the pressing operation in any particular cycle.

*Description of apparatus*

Referring to the drawings and in particular to FIG. 1, the apparatus comprises an expandable core plate 11, around which the continuous tubing is formed. The core plate 11 consists of an inner section 12 and two outer sections 13 and 14. The inner section 12 is longitudinally tapered, the wider portion being forward of the apparatus. It is dovetailed with respect to the two outer sections 13 and 14 (as shown in FIGS. 2 and 3). Thus it is able to slide forward and backward with respect to the two outer sections. The dove-tailing 15 can be as shown in FIGS. 2 and 3, but of course other similar methods of attachment can be used.

The inner section 12 is moveable with respect to the two outer sections 13 and 14 by means of two air cylinders 16 and 17, as shown in FIG. 1. Air cylinders 16 and 17 are attached to a source of compressed air which is not shown in the drawings. Forward movement of pistons 20 and 21 in air cylinders 16 and 17, respectively, causes the inner section 12 to move forward with respect to the two outer sections 13 and 14. Such forward movement decreases the overall width of the core plate 11. Retracting the pistons 20 and 21 into the air cylinders 16 and 17 moves the inner section 12 rearwardly with respect to the two outer sections 13 and 14. This acts to increase the overall width of the core plate 11.

The forward portion 22 of the expandable core plate 11 is greater in overall width than the rest of the structure. This greater width facilitates gripping a length of flexible material folded around the core plate when the core plate itself is widened. The wider forward portion 22 also acts to place the material under lateral tension during the actual pressing operation. A series of transverse slots 23 are cut into the core plate 11 at either side of the forward portion 22. These slots 23 prevent the conduction of heat longitudinally along the core plate 11. Thus, the curing can be confined to a specific length H in the forward portion 22 of the core plate 11. (See FIG. 6).

Pre-laminated rubber coated cord fabric plies are rolled up on rolls 24 and 25, as shown in FIGS. 6–9. The plies on the rolls are assembled as shown schematically in FIG. 2.

In the embodiment selected for illustration the plies on roll 24 consist of two seaming strips 26 placed in the lower-most position followed by stepped plies 27, 30, 31 and 32, as shown in FIG. 2. The plies on roll 25 consist of stepped plies 33, 34, 35 and 36, also as shown in FIG. 2. After being folded into position, ply 36 butts up against ply 27, over-lapping strips 26. Ply 35 butts up against ply 30, overlapping the edges of ply 27. Ply 34 butts up against ply 31, overlapping the edges of ply 30. Finally, ply 33 butts up against ply 32, overlapping the edges of ply 31. This arrangement is shown in detail in FIG. 3.

It should be understood, of course, that the tacky state of the unvulcanized rubber coated cord fabric plies permits them to function as a unitary sheet. Thus, the grouping of plies 26, 27, 30, 31 and 32 forms one sheet of material 37. Similarly, plies 33, 34, 35 and 36 form another sheet of material 40.

The lower plied up sheet of material 40 is folded around the core plate 11 by means of two guides 41 and 42. These guides 41 and 42 guide the edges of the lower sheet of material 40 so that the edges fold around the core plate 11 and assume the abutting relationships above described and shown in FIG. 3.

Attached to the rear of inner core plate section 12 is a rack and pinion mechanism 43 for giving longitudinal movement to the entire core plate 11. The mechanism 43 consists of a rack 44 and a pinion 45. The pinion 45 is actuated by means which are not shown. Piston rods 20 and 21 are attached to the inner core plate section 12 and air cylinders 16 and 17 are attached to the outer core plate sections 13 and 14, respectively. Thus, it can be seen that the rack and pinion mechanism 43 can impart longitudinal motion to the entire core plate 11, even though it is attached only to the inner core plate section 12.

Curved edge mold plates 46 are provided for curing the vulcanizable material adjacent to the edges of the core plate 11. These edge mold plates 46 are preferably made of spring steel. They are laterally moveable by means of air cylinders 47 and piston rods 50. The air cylinders 47 are actuated from a source of compressed air which is not shown.

Positioned below the forward portion of the expandable core plate 11 is a lower heated platen 51. Platen 51 must be vertically moveable to clear the lower portion 52 of the curved edge mold plates 46. This is shown in FIG. 4. Passages 53 for heated fluids, which may be conveniently either steam or hot water, are provided over the distance H in platen 51, as shown in FIG. 6.

Disposed vertically above platen 51 is a reciprocable pressing platen 54, shown in FIGS. 4, 5 and 6. Passages 55 are provided in platen 54 for steam, hot water or other heating fluids. Platen 54 is adapted to exert pressure on the vulcanizable material disposed over the upper portion of core plate 11. Platen 51 is adapted to resist this pressure and, in doing so, exert pressure on the material underneath core plate 11.

A wind-up roll 56 is provided forward of the apparatus 10. As each length of material is cured and seamed, it is wound up on roll 56. This is shown in FIGS. 6–9.

*Method of operation*

The operation of the apparatus will be described by detailing one complete cycle.

Following the completion of a curing cycle with respect to one length of material A, air cylinders 16 and 17 are actuated to thrust piston rods 20 and 21 forward. This acts to push the inner core plate section 12 forward with respect to the outer core plate sections 13 and 14. Inasmuch as the inner section 12 is wider at its forward portion, this relative movement acts to decrease the overall width of the core plate 11. Core plate 11 may then be moved rearwardly by means of the rack and pinion mechanism 43, as the reduced width of the core plate permits it to slide freely within the folded material. The thus retracted core plate 11 is shown in FIGS. 6 and 7. This is effectively the start of any particular cycle of operations.

Retraction of piston rods 20 and 21 into air cylinders 16 and 17, respectively, moves inner core plate section 12 rearwardly with respect to outer core plate sections 13 and 14. This acts to increase the overall width of core plate 11. The forward portion 22 of core plate 11 is then able to grip a length of flexible material by reason of its greater overall width. The thus expanded core plate 11 is shown in FIG. 8.

Pinion 45 is then actuated to advance the expanded core plate 11 and the flexible material forward. The lower sheet of plied up material 40 is folded into the correct relationship with respect to the upper sheet of plied up material 37 by means of the guides 41 and 42. FIG. 8 shows the apparatus 10 with the core plate 11 in its expanded position being moved forward by the rack and pinion mechanism 43. During this period of forward motion, the previously cured length of material A is also moved forward to be wound up on roll 56.

When the rack and pinion mechanism 43 has advanced the expanded core plate 11 to its forwardmost position, the previously cured length of material A is completely clear of the heating range H, as shown in FIG. 9. The core plate 11 is in its expanded position and the rack 44 is in its most forward position, too. The forward portion 22 of the core plate 11, by virtue of its greater overall width, maintains a slight lateral tension on the folded material positioned between platens 51 and 54.

Up to this point in the cycle, lower platen 51 has been in the position shown in FIG. 4. Upper platen 54 is in its uppermost position, also as shown in FIG. 4. The curved edge mold plates 46 are laterally retracted, as also shown in FIG. 4.

Actuation of air cylinders 47 causes piston rods 50 to move laterally inwardly, thus pressing the curved edge mold plates 46 up against the material adjacent the edges of core plate 11. The lower heated platen 51 is then moved upwardly and fixed into position, so as to be able to withstand the application of pressure from the upper platen 54. Upper platen 54 is then moved downwardly to exert pressure on the assembly, as clearly shown in FIG. 5. The spring steel curved edge mold plates 46 are pressed into intimate contact with the material around core plate 11 by both the lateral pressure exerted by the air cylinders 47 and also by the vertical pressure exerted by the upper platen 54. Since the curved edge mold plates 46 are made from thin gauge metal, they are able to conduct heat from platens 51 and 54 to the material around the edges of core plate 11. This application of heat and pressure cures the length of vulcanizable material disposed over the heated area H. Seams are also formed at the lines of juncture of the upper sheet of plied up material 37 and the folded lower sheet of plied up material 40. The completion of the required length of time for vulcanization thus cures another length of material.

The slots 23 positioned forward and rearward of the heated area H prevent over-curing of the material, as will be well known to those skilled in the art.

I have thus disclosed an apparatus capable of forming the tubular body portions of flexible collapsible containers in a continuous manner. The lengths of cured and seamed material are rolled up on the wind-up roll 56, thus making it possible to cut off lengths of tubing as desired to form containers of various sizes. The apparatus discussed above is, of course, manifestly capable of wide variations without departure from the spirit and scope of the invention. The specific example has been chosen only to illustrate the invention and should not, therefore, be construed to imply any restriction on the invention, which is to be limited only by the scope of the following claims.

Having thus described my invention, what I claim and desire to protect by Letters Patent is:

1. Apparatus for forming a continuous collapsible tube from flexible vulcanizable material comprising an expandable core plate around which the tube may be formed, means to guide the flexible vulcanizable material in folded overlapping relationship around said core plate, means to expand said core plate laterally to grip a length of the flexible material folded around said core plate, means to advance said thus expanded core plate and the thus gripped length of flexible material longitudinally forward, a heated lower platen disposed beneath the forward portion of said expandable core plate and adapted to withstand the application of pressure, and a reciprocable pressing platen mounted directly above said lower platen and adapted to exert pressure on the length of flexible material folded around said core plate and disposed over said lower platen, thereby to cure the length of flexible material and to form securely bonded seams at the overlapped portions.

2. Apparatus as described in claim 1, in which said expandable core plate comprises an inner section and two outer sections, said inner section being slidably attached to said outer sections, said inner section being longitudinally tapered, whereby longitudinal movement of said inner section with respect to said outer sections varies the overall width of said core plate.

3. Apparatus as described in claim 2, in which said inner core plate section is wider at said forward portion of said expandable core plate, whereby forward longitudinal movement of said inner section with respect to said outer core plate sections decreases the overall width of said core plate and rearward longitudinal movement of said inner section with respect to said outer sections increases the overall width of said core plate.

4. Apparatus as described in claim 1, in which said forward portion of said expandable core plate is greater in overall width than the rest of said expandable core plate, thus to facilitate gripping the flexible material folded around said core plate and to place the material disposed over said lower platen under lateral tension during the curing thereof.

5. Apparatus as described in claim 4, in which said forward portion of said expandable core plate has transversely extending slots on either side of said heated lower platen, thereby to prevent the conduction of heat longitudinally along said core plate.

6. Apparatus as described in claim 5, further comprising curved mold plates adjustably disposed adjacent each edge of said forward portion of said expandable core plate, and means for pressing said curved mold plates against the flexible material disposed around each of said edges of said forward portion of said expandable core plate.

References Cited in the file of this patent

UNITED STATES PATENTS

| | | |
|---|---|---|
| 2,389,725 | Gillis et al. | Nov. 27, 1945 |
| 2,486,763 | Roberts | Nov. 1, 1949 |
| 2,829,699 | Pazan | Apr. 8, 1958 |